Aug. 11, 1931.  E. A. DOW  1,818,050

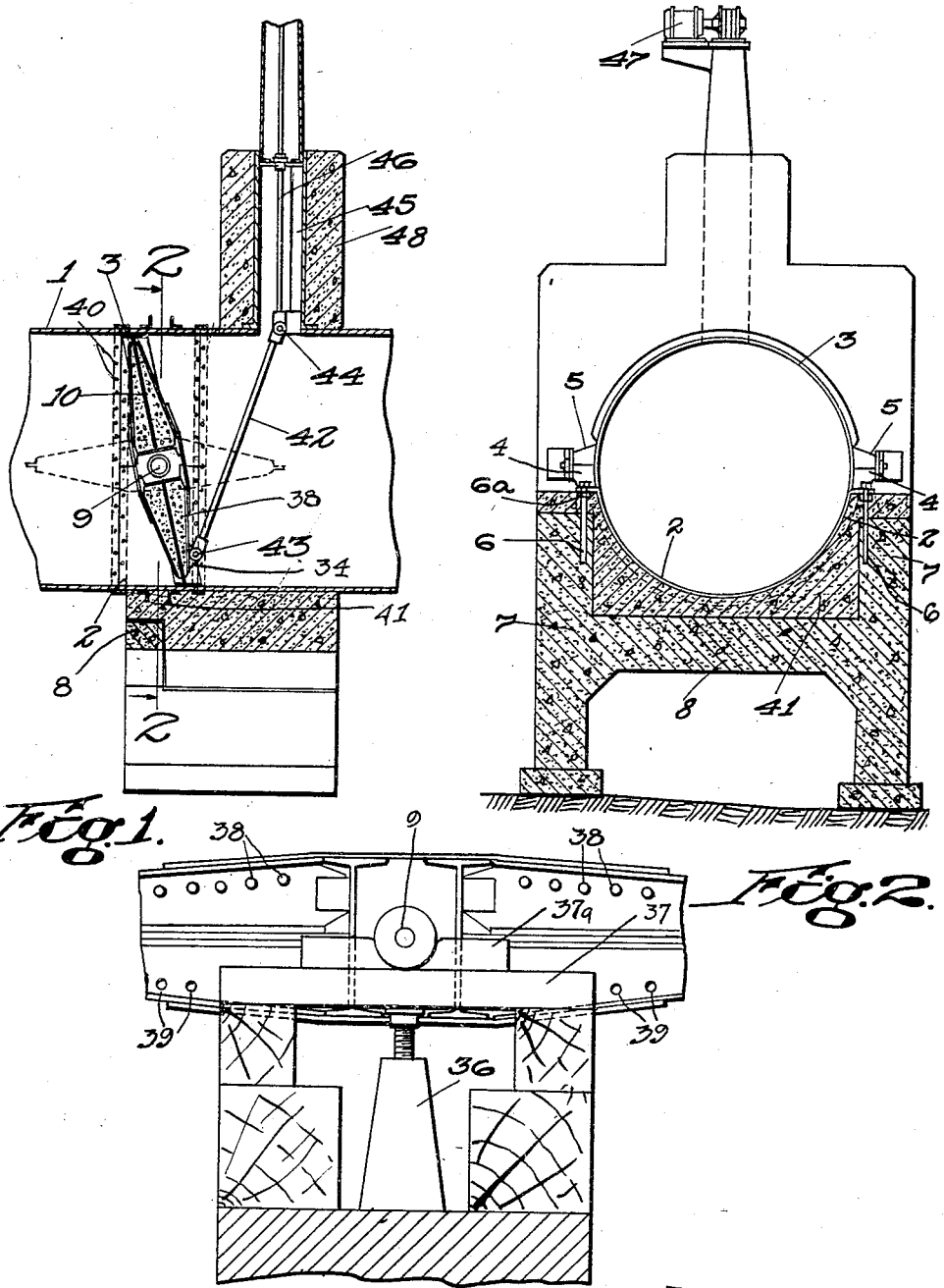

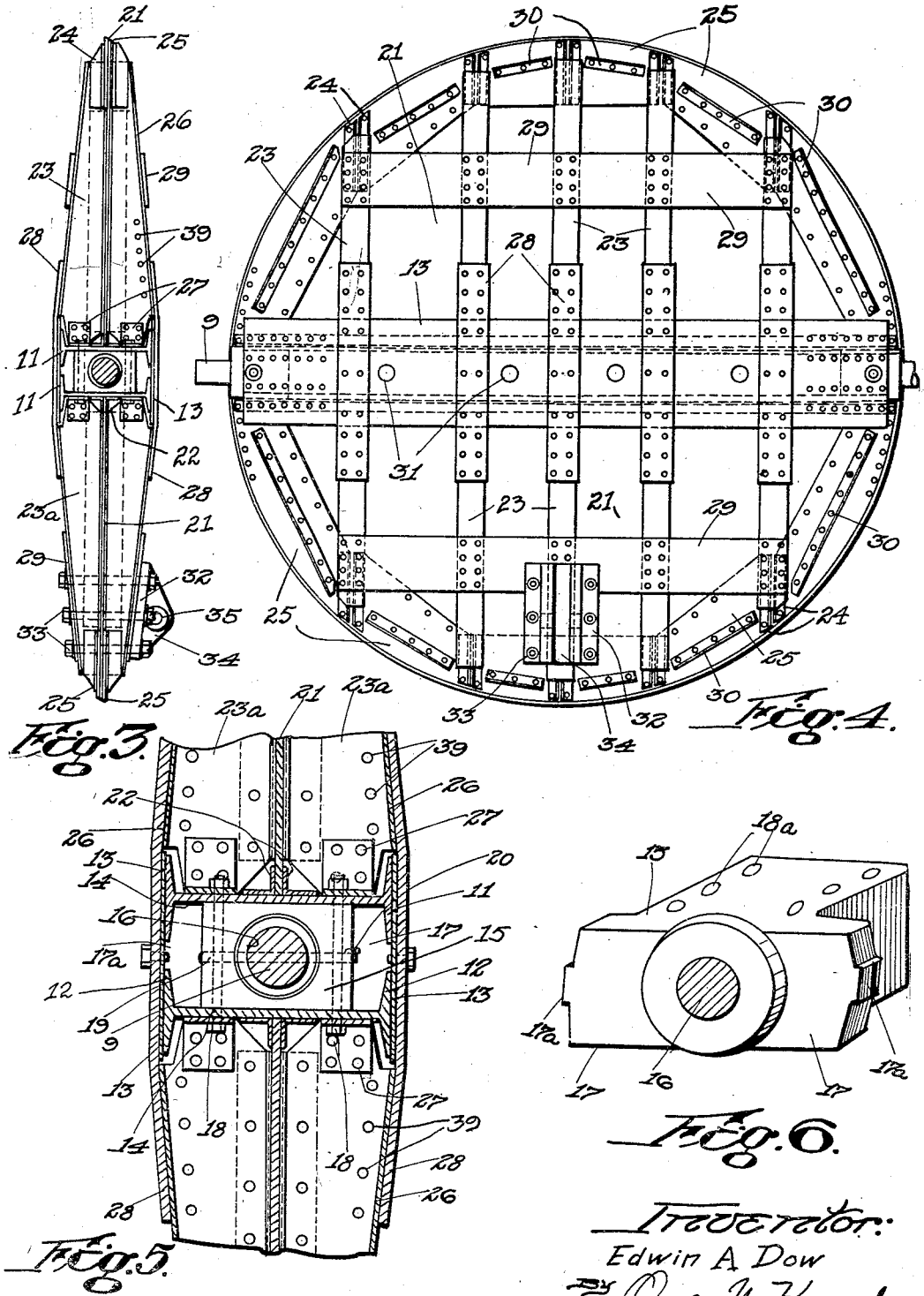

VALVE CONSTRUCTION

Filed Aug. 21, 1928   3 Sheets-Sheet 3

Inventor
Edwin A. Dow
By Owen W. Kennedy
attorney

Patented Aug. 11, 1931

1,818,050

UNITED STATES PATENT OFFICE

EDWIN A. DOW, OF WORCESTER, MASSACHUSETTS

VALVE CONSTRUCTION

Application filed August 21, 1928. Serial No. 301,004.

My invention relates to an improved construction of a pivoted disk or butterfly valve of the type used, for example, in large conduits or pipes to control the flow of a fluid such as water, under pressure and in large volume. Valves of this type are commonly employed in conduits, or penstocks, supplying the water wheels of hydro-electric plants and a general form of a valve of this type, together with mechanism for operating same, is shown in my Patent No. 1,603,455 issued October 19, 1926.

The object of the present invention is to provide an improved valve construction that is particularly adapted for valves of large diameter, my improved valve construction being particularly characterized by its great strength, lightness of weight, cheapness of manufacture and ease of installation as compared with valves of the same type as previously constructed. Valves of this type have heretofore been cast and when the diameter of such a casting exceeds ten feet as it frequently does, it is very difficult to transport and install the valve in its conduit and pivot bearings.

According to the present invention, I provide an improved valve built up of structural steel members which have great strength and rigidity when assembled, and at the same time are lighter in weight as compared to a cast valve of the same diameter. Furthermore, the skeleton steel work of my valve is readily adapted to be shipped in pieces from the place of fabrication and assembled in the field. At the time of setting up the valve in the field, it is possible to complete most of the work of installing the valve casing and pivot bearings before finally concreting the skeleton valve frame.

My invention also contemplates an improved form of seat for the valve in its surrounding casing, which seat is adapted to provide a very tight seal when the valve is moved to its closed position to prevent leakage of water past the valve. The above and other advantages features of my invention will hereinafter more fully appear, reference being had to the accompanying drawings in which—

Fig. 1 is a longitudinal sectional view through the valve casing and portion of a conduit showing a completed valve in position.

Fig. 2 is a sectional view along the line 2—2 of Fig. 1, with the valve removed.

Fig. 3 is a view in end elevation showing the structural steel assembly of the valve before pouring the concrete to complete the valve.

Fig. 4 is a view in front elevation of the structure shown in Fig. 3.

Fig. 5 is a fragmentary sectional view of the middle portion of the valve assembly on an enlarged scale.

Fig. 6 is a perspective view showing one of the valve shaft trunnions.

Fig. 10 is a fragmentary view showing the manner of supporting the assembled valve when concreting the same.

Like reference characters refer to like parts in the different figures.

Figure 7:
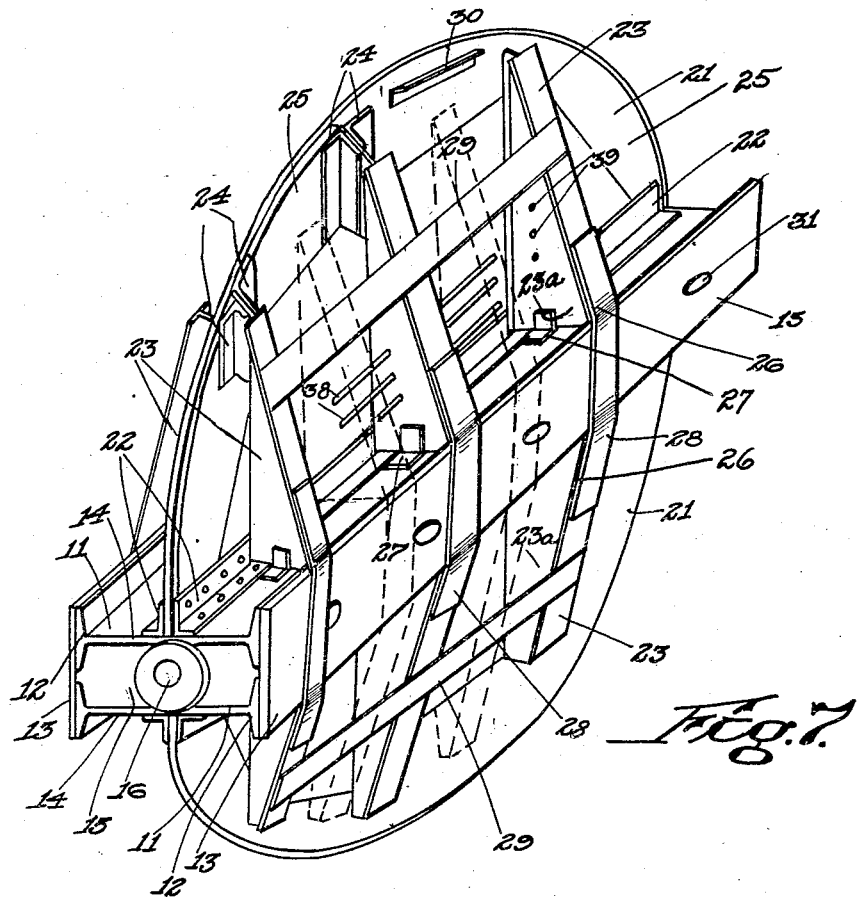
Fig. 7 is a perspective view of the valve shown in Fig. 3, certain parts being shown in dotted lines.
Figure 8:
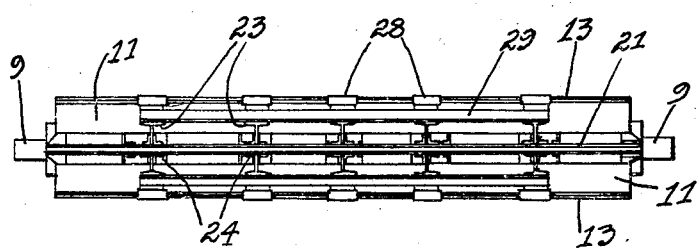
Fig. 8 is a plan view of the valve.

Referring to Figs. 1 and 2, a portion of a conduit or penstock 1 is shown in which is connected a pair of semicircular valve housing sections 2 and 3 adapted to provide a pivotal support for my improved valve. The opposed valve housings 2 and 3 carry cooperating bearing members 4 and 5 and the lower housing 2 is secured by anchor bolts 6 to the sides 7 of a concrete saddle 8. The bearings 4 and 5 serve to support between them a shaft 9 carrying my improved valve generally designated by the reference character 10 in Fig. 1, the valve 10 being removed in Fig. 2.

Referring now to Figs. 3 to 6 inclusive the valve 10 is shown as being built up of structural steel members most of which do not appear in Fig. 1, as the valve is there shown as having been completely installed with most of its structural steel frame work embedded in concrete. Therefore before again referring to the completed valve 10 and its cooperation with the valve housing sections 2 and 3, a detailed description of the structural steel assembly will first be given.

As best shown in Figs. 5 and 7, the structural assembly of the valve comprises a central box-like structure consisting of I-beams 11, 11 disposed in parallel relation and secured together along their alined flanges 12 by plates 13. The space between the parallel webs 14 of the beams 11 is closed at each end by a bearing or trunnion block 15 and as shown in Fig. 6 the trunnions 15 provide axially alined openings 16 for receiving the shaft 9 which projects at each end beyond the valve for pivotal support in the valve housing bearings 4 and 5 previously referred to. As clearly shown in Fig. 6, each trunnion block 15 provides a pair of opposed flanges 17 that are adapted to fit between the opposed webs 14 and flanges 12 of the beams 11, each flange 17 providing a shoulder 17a that is adapted to closely fit in the space between the flanges 12 on opposite sides of the shaft 9.

With this construction, the trunnion blocks 15 are accurately positioned at opposite ends of the central box structure of the valve frame and are removably secured in position by bolts 18 extending through the webs 14 and through openings 18a in the trunnions 15. The shaft 9 is rigidly secured in each trunnion 15 by means of a pin 19 extending completely through the body of the block and through the middle of the shaft 9, each pin 19 being locked against longitudinal movement by means of a set screw 20 as shown in Fig. 5. As a result, the shaft 9 becomes in effect, an integral part of the trunnions 15 and the central box structure, so that the whole valve structure turns with the shaft 9.

Referring again to Fig. 7, the central shaft receiving structure has attached thereto on each side a semicircular disk 21 extending in a plane at right angles to the parallel webs 14 of the beams 11. Each disk 21 is secured to the middle of the engaged web 14 by angle members 22 extending along the inner edges of each disk 21 on both sides, the legs of the angle members 22 being riveted to the web 14 and to the disk 21, respectively. Each disk 21 has further secured thereto on opposite sides a number of pairs of opposed braces 23 in the form of T-beams, each brace 23 having its triangular web 23a at right angles to both the disk 21 and the web 14 of the corresponding I-beam 11. Each brace 23 is secured to a disk 21 near its outer periphery by a pair of angle members 24 between the opposed legs of which is received the upper end of the web 23a. Only the two end and middle braces 23 are shown in full lines in Fig. 7, the other two intermediate braces being merely indicated in dotted lines in order to simplify the perspective drawing of Fig. 7.

The edge of each central disk 21 is reinforced around its periphery by a number of chord shaped plates 25, these plates being disposed on opposite sides of a disk 21 between the angle members 24 as clearly shown in Fig. 4. The chord plates 25 extend slightly beyond the edge of a disk 21 on one side while the plates 25, on the other side, are set back slightly so that the edge of each disk 21 and its attached plates 25 presents a beveled appearance, the bevel on the upper disk 21 being opposite to the bevel of the lower disk 21, see Fig. 3. The function of these bevel edges in the seating of the valve will be hereinafter referred to with reference to Fig. 1.

The triangular web 23a of each brace 23 is wider at the end where it abuts an I-beam 11 of the central box structure, the width of the web 23a at this point being such as to bring the flange 26 of the brace 23 into alinement with a plate 13 which secures the I-beams 11 together. The wider end of the web 23a is secured to the web 14 of a beam 11 by means of angle members 27, the web 23a being cut away near its point of attachment to clear the angle members 22 which secure a disk 21 to the web 14, see Fig. 5. As previously pointed out, the braces 23 are secured to each disk 21 in pairs so that the profile of the valve structure as viewed from one end of the shaft 9 is generally elliptical in form as shown in Fig. 3. It is to be noted that the braces 23, all terminate short of the actual periphery of a disk 21 so that the actual edge of the valve 10 is provided by the chord plates 25 with the opposed disks 21 secured between them and braced by the angle members 24, the legs of which are beveled off as they approach the periphery of the disks 21.

The braces 23 are also secured to the central box structure by means of tie plates 28 secured to the vertically alined flanges 26 of a pair of braces 23 and to the plate 13 which secures the I-beams 11 together. The braces 23 are further secured in a lateral direction by means of cross plates 29 secured to the parallel flanges 26 above and below the central box structure. In this way, the disks 21 are rigidly secured to the central box structure which contains the shaft 9, the braces 23 serving as a series of cantilevers extending from each side of the central axis to rigidly brace the plates 21 against deflection caused by pressure on the edges of the valve 10.

In order to further strengthen the edges of the disks 21 and to provide reinforcement for the concrete when it is finally poured, angle members 30 are secured to the chord plates 25 between the side braces 23, thereby providing a number of ribs projecting at right angles from the plates 25 substantially around the entire periphery of each disk 21.

In order that concrete may be poured into the space between the webs 14 of the central box structure, openings 31 are provided which extend through the plate 13 on what is the down stream side of the valve, as installed. The valve 10 further provides a bracket 32 secured to the central lower brace 23 on the down stream side of the valve by means of through bolts 33 extending through to the cross plate 29 and one of the chord plates 25 on the opposite side of the valve. This bracket 32 provides a lug 34 with an opening 35 for the pivotal attachment of suitable means for turning the valve on its pivot shaft 9 after it has been installed as will next be described.

The respective half sections 2 and 3 of the valve housing having been separately assembled and the concrete saddle 8 for the housing having been poured as shown in Fig. 2, the first step in installing the valve 10 consists in placing the lower half of the valve housing 2 in position on the anchor bolts 6 and then elevating the housing section 2 to grade by means of nuts 6a. The skeleton valve frame is then lowered horizontally into place with its shaft ends 9 received in the lower bearings 4 as indicated in dotted lines in Fig. 1. The valve 10 is then raised at each end by a jack 36 shown in Fig. 10, cooperating with a bar 37 providing stop blocks 37a to hold the valve steady. The valve is then in position for pouring one half thereof, but before the concrete is poured reinforcing rods 38 are passed through alined openings 39 in the webs of the braces 23 which rods are parallel to the cross plates 29 as indicated in the perspective view of Fig. 7. One half of the valve is then poured with concrete, suitable forming having been applied to the valve 10 where necessary to confine the concrete. In case the down stream side of the valve is first presented for concreting, the central bearing structure is filled through the openings 31. When the concrete in this half of the valve has hardened sufficiently, the lower housing section 2 is lowered on the anchor bolts 6 to permit the partially concreted valve to be turned through 180° on the jack supported blocks 37, the lowering of the housing section 2 permitting the valve to be turned freely. This turning brings the open side of the valve in a horizontal position, whereupon this half is concreted, as before, after placing another set of reinforcing rods 38 in position.

The valve 10 having been completely poured, it then appears as shown in full lines in Fig. 1, and when the valve has hardened the lower housing section 2 is elevated to grade on the bolts 6, as before, and the upper housing section 3 is then placed in position with its bearings 5 registering with the bearings 4. The two housing sections 2 and 3 are then secured together by rivets 40 extending along the horizontal joints between the sections and around the circumferential joints between the housing sections 2 and 3 and the abutting portions of the conduit, or penstock 1. The next step in installing the valve consists in turning the completed valve 10 to its closed position and maintaining it in this position with jacks, the fitting of the valve around its circumference being checked with suitable feelers. This fitting of the valve 10 under the pressure of the jacks results in a certain initial deformation of the housing sections 2 and 3, it being evident from Fig. 1 that the inside diameter of the cylindrical housing is somewhat less than the outside diameter of the valve 10 measured at right angles to its pivotal axis. Consequently, as the perimeter of the rigid valve 10 engages the walls of the housing, under pressure, the relatively thin metal of the housing sections 2 and 3 conforms generally to the exact shape of the valve. The valve 10 having been closed tightly, the lower housing section 2 is encased in concrete by filling the space between the housing section 2 and the supporting saddle 8, this concrete being indicated at 41 and extending up to the bottom of the bearings 4 above the previously concreted sides 7 of the saddle 8. This concrete 41 serves to maintain the housing section 2 in the exact shape to which it was formed by the previous closure of the valve 10. The valve 10 is then ready to be connected to its operating mechanism, here shown as consisting of a rod 42 connected to the lug 34 by a pin 43. The rod 42 is connected to a vertically movable cross head 44, adapted to be moved up and down on its guide 45 by means of a shaft 46 driven by an electric motor 47. The cross head guide 45 is supported by a suitable concrete structure 48, which is poured after the hoist has been installed and the operation of the valve 10 by the cross head 44 checked to insure against binding.

Figure 9:
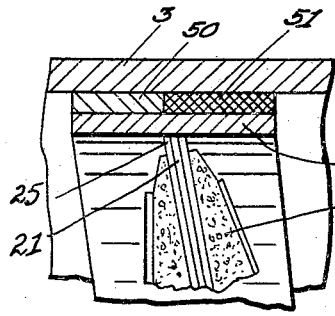
Fig. 9 is a detail of a portion of the valve seat shown in Fig. 1.

As previously pointed out, my invention also contemplates an improved valve seat and this seat construction is shown in Fig. 9 as consisting of a ring 49 of somewhat smaller external diameter than the internal diameter of the combined valve housing sections 2 and 3. The ring 49 is preferably composed of bronze and is carried on an anchor ring 50, of steel, fitting closely within the valve housing at an angle of about 10° from the vertical. The inner bronze ring 49 is considerably wider than its anchor ring 50 and the space between the inner ring 49 and the valve housing, not occupied by the anchor ring 50, is filled with a compressible caulking material 51, such as lead wool, or material having similar qualities. This caulking material 51 is packed in closely between the ring 49 and the valve housing, with the valve 10 in closed position, the caulking material 51 acting as a wedge to shape the bronze seat ring 49 very accurately to the edge of the valve disks 21. In this way, the seat ring 49 is adapted to take care of minor irregularities in the edge of the valve 10 which have not been previously taken care of when seating the valve. When seating the valve under pressure in the manner previously described, it is evident that the anchor ring 50 which fits closely within the housing sections 2 and 3 will initially conform itself to the perimeter of the valve 10 just as if it were a part of the housing.

From the foregoing, it is apparent that by my invention I have provided an improved valve structure of the character set forth which is particularly adapted to be installed in conduits or penstocks of large diameter, because of the fact that the structural steel assembly is very much lighter than a cast metal valve of the same diameter, and its members can be readily assembled in the field. Furthermore, when the skeleton valve structure has been filled with concrete, the completed valve which results possesses very great strength, due to the inherent strength of the structural steel members and the added rigidity and strength obtained by embedding these parts in concrete. A valve so constructed will show no leakage due to distortion around its edges, owing to the reinforcements of the valve disks 21 and, furthermore, the smooth concrete surface of the valve reduces hydraulic losses when water is flowing through the conduit, with the valve opened. Under some conditions, it may be desirable not to embed either of the valve housing sections in concrete, in which case the flexibility of the sheet metal housing insures a close fit each time the rigid valve is closed. Under conditions of light pressure in the conduit, the caulking behind the valve seat may also be omitted. My invention is also susceptible of other modifications without departing from the spirit and scope thereof, as set forth in the appended claims.

I claim,

1. A valve construction comprising structural steel members assembled and joined together to provide a central circular disk portion with bracing members extending from oposite sides thereof.

2. A valve construction comprising structural steel members assembled and joined together to provide a central circular disk portion with alined pairs of bracing members extending from oposite sides thereof, each pair of said bracing members converging towards the periphery of said central portion.

3. A valve construction comprising semi-circular disk portions extending from opposite sides of and at right angles to a central box-like structure and bracing members located in the angles between said disk portions and said central structure.

4. A valve construction comprising semi-circular disk portions extending from opposite sides of and at right angles to a central box-like structure and triangular bracing members located in the angles between said disk portions and said box-like structure and secured to said disk portions and said box-like structure, respectively.

5. A valve construction comprising semi-circular disk portions extending from opposite sides of and at right angles to a central box-like structure and bracing members located in the angles between said disk portions and said box-like structure and secured to said disk portions and said box-like structure respectively, said bracing members being triangular in form to resist deflection of the edges of said disk portions.

6. A valve construction comprising a circular structural steel assembly elliptical in profile, the structural steel members of said assembly being embedded in concrete.

7. A valve construction comprising a structural steel assembly providing a circular central disk portion with triangular braces extending from opposite sides thereof, said disk portion and braces being embedded in concrete to provide a circular valve elliptical in profile and having a smooth exterior surface.

8. A valve construction comprising a hollow rectangular central structure with semi-circular disks secured to opposite sides thereof and means for supporting a longitudinal shaft at the ends of said rectangular structure.

9. A valve construction comprising a hollow rectangular structure, semi-circular disks secured to and braced on opposite sides of said structure and trunnion blocks secured within each end of the rectangular structure for receiving a shaft extending longitudinally through the structure.

10. A valve construction having a seat for receiving a pivoted disk valve comprising, in combination, a circular valve casing, a seat ring of thin metal secured within said casing with a portion thereof rigidly spaced from the wall of said casing and packing material occupying a space between the said seat ring and the wall of the valve casing.

11. A valve construction comprising a valve casing, a bronze seat ring for a pivoted disk valve having an outside diameter less than the inside diameter of the surrounding valve casing, a steel ring for supporting a portion of said bronze seat ring and fibrous metallic packing received in the space between another portion of the said bronze ring and the wall of the valve casing to provide a wedging support for a portion of said bronze seat ring.

12. The improvement in installing a disk valve within a circular casing which consists in supporting a skeleton valve structure in a horizontal position within a half portion of the valve casing, filling first one-half and then the other half of the skeleton valve structure with concrete and finally installing the upper half of the valve casing over the completed valve.

13. The improvement in installing a disk valve within a circular casing which consists in erecting the lower half of the valve casing, temporarily supporting a skeleton valve assembly in a horizontal position within said casing portion, filling one-half of the valve structure with concrete, reversing said valve structure, then filling the other half of said skeleton valve structure with concrete and finally in installing the upper half of the valve casing with said completed valve pivotally supported between the upper and lower portions of said casing.

14. The improvement in installing a rigid disk valve pivotally mounted on a fixed axis within a generally cylindrical casing having walls of relatively flexible metal, with the inside diameter of said casing less than the greatest outside diameter of said valve, which consists in turning said valve on its axis to force its perimeter into wedging engagement with the inner wall of said casing so as to shape said casing to the perimeter of said valve.

15. The improvement in installing a rigid disk valve pivotally mounted on a fixed axis within a generally cylindrical casing having walls of relatively flexible metal, with the inside diameter of said casing less than the greatest outside diameter of said valve, which consists in turning said valve on its axis to force its perimeter into wedging engagement with the inner wall of said casing so as to shape said casing to the perimeter of said valve, and in subsequently inclosing the outside of said casing in concrete to maintain said casing in the shape to which it is formed by the previous closure of said valve.

16. The improvement in installing a rigid disk valve pivotally mounted on a fixed axis within a generally cylindrical casing formed of relatively flexible metal and providing a deformable valve seat ring, which consists in turning said valve about its axis to develop a wedging action which initially shapes said ring and casing to the perimeter of said disk and in subsequently wedging said valve seat ring to take up minor irregularities in the perimeter of the valve disk not taken care of by the initial shaping of said ring and casing.

EDWIN A. DOW.